United States Patent
Ando et al.

(10) Patent No.: US 10,063,680 B2
(45) Date of Patent: Aug. 28, 2018

(54) PORTABLE TERMINAL, AND METHOD FOR CONTROLLING PORTABLE TERMINAL

(71) Applicant: Sharp Kabushiki Kaisha, Sakai, Osaka (JP)

(72) Inventors: Tadao Ando, Sakai (JP); Nobuhisa Nakagawa, Sakai (JP); Fumitoshi Tanoue, Sakai (JP); Masaaki Nakae, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/512,088

(22) PCT Filed: Sep. 15, 2015

(86) PCT No.: PCT/JP2015/076140
§ 371 (c)(1),
(2) Date: Mar. 17, 2017

(87) PCT Pub. No.: WO2016/052172
PCT Pub. Date: Apr. 7, 2016

(65) Prior Publication Data
US 2017/0279952 A1    Sep. 28, 2017

(30) Foreign Application Priority Data
Sep. 29, 2014 (JP) .................................. 2014-199354

(51) Int. Cl.
*H04M 3/537* (2006.01)
*H04M 19/04* (2006.01)
(Continued)

(52) U.S. Cl.
CPC ... *H04M 1/72522* (2013.01); *H04M 1/72563* (2013.01); *H04M 3/537* (2013.01); *H04M 19/04* (2013.01); *H04W 4/02* (2013.01)

(58) Field of Classification Search
None
See application file for complete search history.

(56) References Cited

U.S. PATENT DOCUMENTS 8,706,162 B1 * 4/2014 Abrahamsson ....... H04M 1/605
455/556.1
2006/0133586 A1   6/2006 Kasai et al.
(Continued)

FOREIGN PATENT DOCUMENTS

JP    2002-344663 A    11/2002
JP    2006-163911 A    6/2006
(Continued)

*Primary Examiner* — Frantz Bataille
(74) *Attorney, Agent, or Firm* — Keating & Bennett, LLP

(57) ABSTRACT

A mobile terminal (1) includes: a motion detecting section (14) configured to detect a state of motion of the mobile terminal and an attitude of the mobile terminal; and an audio output control section (12) configured to (a) determine whether or not the mobile terminal is outputting audio and (b) in a case where notification conditions have been satisfied, notify the user, via audio that information to be provided to the user has been acquired. The notification conditions include a state where the mobile terminal has remained stationary for a predetermined period after undergoing movement; a state where, after the movement, the mobile terminal has remained in a predetermined attitude for a predetermined period; and a state where, after the movement, the mobile terminal is not outputting audio other than audio for notification.

16 Claims, 4 Drawing Sheets

(51) Int. Cl.
H04W 4/02 (2018.01)
H04M 1/725 (2006.01)

(56) References Cited

U.S. PATENT DOCUMENTS

2009/0128346 A1* 5/2009 Zhao .................. G08B 21/24
                                                340/636.15
2014/0085341 A1* 3/2014 Shin ..................... G09G 5/38
                                                    345/659
2014/0206316 A1* 7/2014 Kim ..................... H04B 1/04
                                                    455/411

FOREIGN PATENT DOCUMENTS

JP          2007-135105 A      5/2007
JP          2014-123826 A      7/2014

* cited by examiner

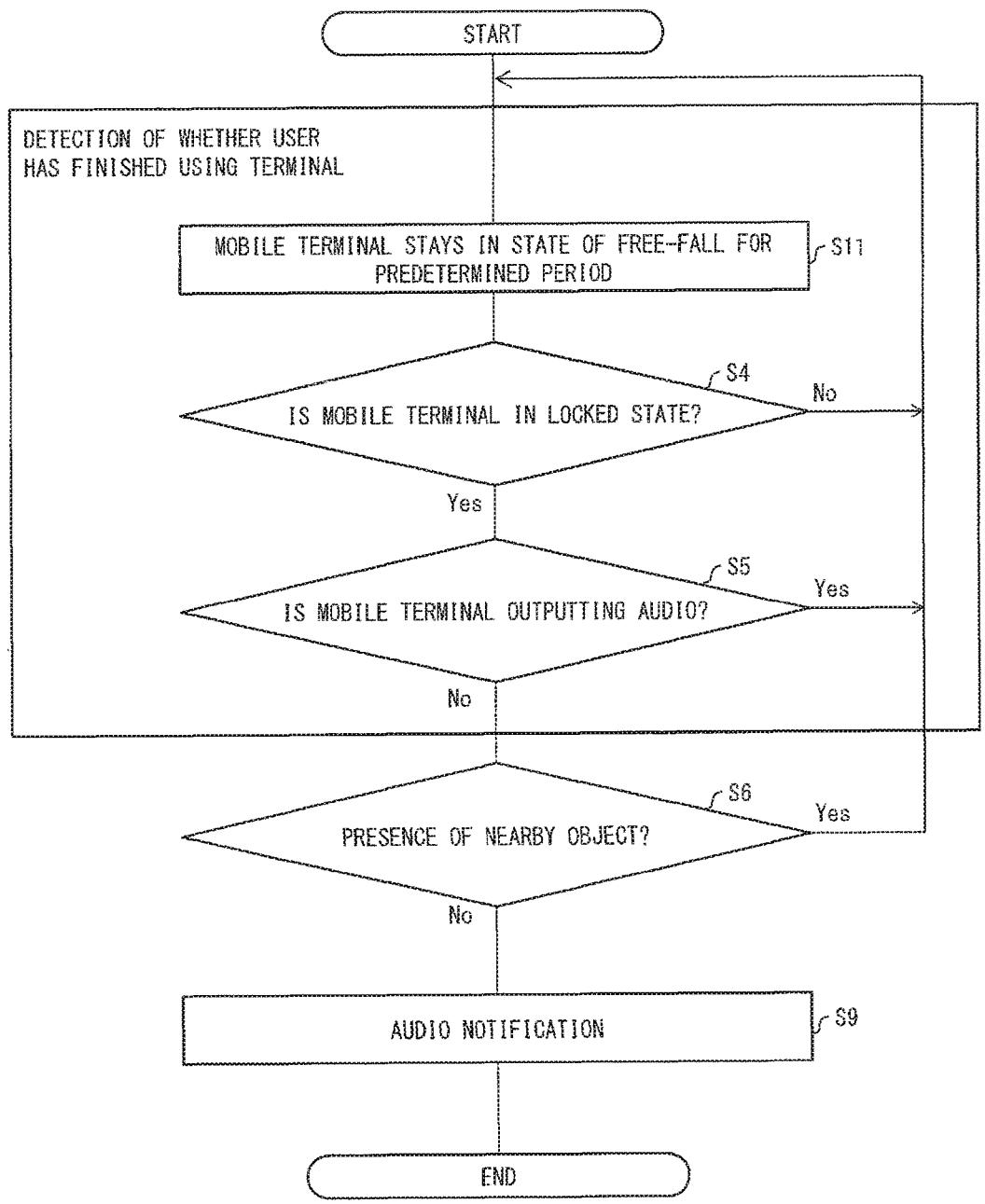

PORTABLE TERMINAL, AND METHOD FOR CONTROLLING PORTABLE TERMINAL

TECHNICAL FIELD

The present invention relates to a mobile terminal.

BACKGROUND ART

Due to advances in internet technology, it is now possible for a user of an internet-connected device to obtain great amounts of information. The fact that the amount of information is so great, however, makes it difficult to notify the user of desired information at a desired time.

Patent Literature 1 discloses an information notification device which stores a viewing history associating (i) a user's location and elapsed time since arrive at the location with (ii) whether or not the user has viewed information. The information notification device refers to the viewing history and notifies the user of information at a point in time at which the user is highly likely to view the information. Patent Literatures 2 through 4 each disclose techniques relating to the timing with which a user is notified of information.

CITATION LIST

Patent Literature

Patent Literature 1
  Japanese Patent Application Publication, Tokukai, No. 2007-135105 (Publication date: May 31, 2007)
Patent Literature 2
  Japanese Patent Application Publication, Tokukai, No. 2002-344663 (Publication date: Nov. 29, 2002)
Patent Literature 3
  Japanese Patent Application Publication, Tokukai, No. 2006-163911 (Publication date: Jun. 22, 2006)
Patent Literature 4
  Japanese Patent Application Publication, Tokukai, No. 2014-123826 (Publication date: Jul. 3, 2014)

SUMMARY OF INVENTION

Technical Problem

Conventional techniques do not, however, take into consideration whether or not the user is using a device when notification of information is carried out. The viewing history referred to by the information notification device of Patent Literature 1 is merely statistical data based on past actions. As such, the information notification device has a problem of potentially hindering user operation by carrying out an information notification while the user is operating the device.

An object of the present invention lies in providing a mobile terminal which carries out a user notification without hindering user operation of the mobile terminal.

Solution to Problem

A mobile terminal in accordance with an aspect of the present invention includes: an information acquiring section configured to acquire information to be provided to a user; a motion detecting section configured to detect a state of motion of the mobile terminal; an attitude detecting section configured to detect an attitude of the mobile terminal; an audio output determining section configured to determine whether or not the mobile terminal is outputting audio; and an audio output control section configured to, in a case where notification conditions have been satisfied, notify the user, via audio, of the information having been acquired, the notification conditions including: a state where the mobile terminal has remained stationary for a predetermined period after undergoing spatial movement; a state where, after the spatial movement, the mobile terminal has remained in a predetermined attitude for a predetermined period; and a state where, after the spatial movement, the mobile terminal is not outputting audio other than audio for notification.

A method, in accordance with another aspect of the present invention, for controlling a mobile terminal, includes the steps of: (a) acquiring information to be provided to a user; (b) detecting a state of motion of the mobile terminal; (c) detecting an attitude of the mobile terminal; (d) determining whether or not the mobile terminal is outputting audio; and (e) controlling audio output so that in a case where notification conditions have been satisfied, the mobile terminal notifies the user, via audio, of the information having been acquired, the notification conditions including: a state where the mobile terminal has remained stationary for a predetermined period after undergoing spatial movement; a state where, after the spatial movement, the mobile terminal has remained in a predetermined attitude for a predetermined period; and a state where, after the spatial movement, the mobile terminal is not outputting audio other than audio for notification. A mobile terminal in accordance with another aspect of the present invention includes: an information acquiring section configured to acquire information to be provided to a user; a motion detecting section configured to detect a state of motion of the mobile terminal; an audio output determining section configured to determine whether or not the mobile terminal is outputting audio; and an audio output control section configured to, in a case where notification conditions have been satisfied, notify the user, via audio, of the information having been acquired, the notification conditions including: a state where the mobile terminal has been in a state of free-fall for a predetermined period; and a state where the mobile terminal is not outputting audio other than audio for notification.

A method, in accordance with another aspect of the present invention, for controlling a mobile terminal, includes the steps of: (a) acquiring information to be provided to a user; (b) detecting a state of motion of the mobile terminal; (c) determining whether or not the mobile terminal is outputting audio; and (d) controlling audio output so that in a case where notification conditions have been satisfied, the mobile terminal notifies the user, via audio, of the information having been acquired, the notification conditions including: a state where the mobile terminal has been in a state of free-fall for a predetermined period; and a state where the mobile terminal is not outputting audio other than audio for notification.

Advantageous Effects of Invention

An aspect of the present invention makes it possible to carry out a user notification without hindering user operation or use of a mobile terminal. This enhances usability of the mobile terminal.

BRIEF DESCRIPTION OF DRAWINGS

FIG. 5 is a diagram showing a flow of how a mobile terminal, in accordance with another embodiment of the present invention, processes an audio notification.

DESCRIPTION OF EMBODIMENTS

Embodiment 1

(Configuration of Mobile Terminal)

Figure 1:
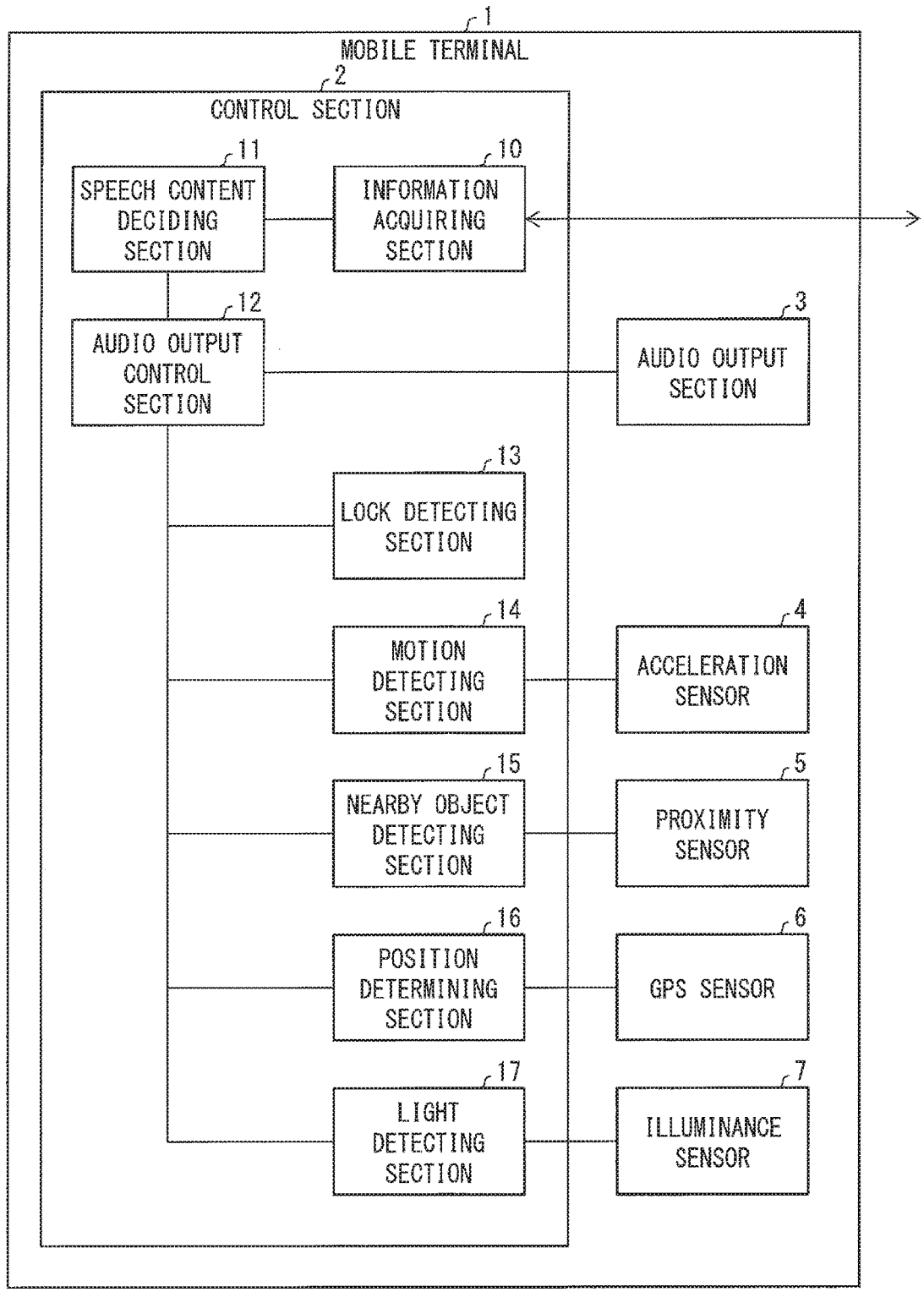
FIG. 1 is a block diagram schematically illustrating a mobile terminal in accordance with an embodiment of the present invention.

FIG. 1 is a block diagram schematically illustrating a mobile terminal 1 in accordance with Embodiment 1. The mobile terminal 1 includes a control section 2, an audio output section 3, an acceleration sensor 4 (motion detecting section, attitude detecting section), a proximity sensor 5 (nearby object detecting section), a GPS sensor 6 (position determining section), and an illuminance sensor 7 (light detecting section). Note that the following description assumes a case where the mobile terminal 1 is a smartphone having a touch panel (screen).

The control section 2 includes an information acquiring section 10, a speech content deciding section 11, an audio output control section 12 (audio output control section, audio output determining section), a lock detecting section 13, a motion detecting section 14 (motion detecting section, attitude detecting section), a nearby object detecting section 15, a position determining section 16, and a light detecting section 17.

The information acquiring section 10 acquires, from a server external to the mobile terminal 1, information (such as news) to be provided to the user. This information acquisition is carried out at a predetermined time (for example, at regular intervals). Communication with the server is carried out via, for example, a wireless access point or a base station. In addition to news, the information to be provided to the user can encompass local event information, movie information, and information related to an anniversary. Such information is, for example, not information which is urgent or for which the user is actively searching, but rather information which provides the user with knowledge or makes the user aware of something. Hereinafter, such information, acquired to be provided to the user, is referred to as "user-targeted information." The information acquiring section 10 supplies the user-targeted information to the speech content deciding section 11.

The speech content deciding section 11 generates audio content for notifying the user that the user-targeted information has been acquired. Audio content thus generated can include a category of the user-targeted information (for example, "movie information" or "event information") and/or details of the user-targeted information. Alternatively, the audio content can simply indicate that the user-targeted information has been obtained. The speech content deciding section 11 supplies the audio content, in the form of audio data, to the audio output control section 12. The speech content deciding section 11 can, alternatively, supply the audio content to the audio output control section 12 in the form of text data, which the audio output control section 12 can then convert into audio data.

The audio output control section 12 controls the audio output section 3 so that the audio output section 3 outputs the audio data. After the user-targeted information has been acquired, in a case where specific notification conditions have been satisfied, the audio output control section 12 notifies the user, via audio, that the user-targeted information has been acquired. The notification conditions will be described later in detail. The audio output control section 12 also determines whether or not the audio output section 3 is outputting other audio. The audio output section 3 is a device, such as a speaker, which outputs audio.

The lock detecting section 13 detects a locked state of the mobile terminal 1. The lock detecting section 13 supplies a detection result to the audio output control section 12. A locked state refers to a state in which a specific unlocking operation is required for the user to operate the mobile terminal 1. While in the locked state, the mobile terminal 1 does not accept certain operations (a menu selection operation, an app startup operation, etc.) other than the unlocking operation. Examples of the unlocking operation encompass entering a specific character string, carrying out a specific touch input on the touch panel, and touching various parts of the screen in a specific order. The locked state can be, for example, a state in which a lock screen is displayed, or a state in which the lock screen exists in a foreground. The foreground refers to, for example, a screen that is displayed after the user turns on the screen of the mobile terminal 1 by carrying out a touch input or other such operation while the screen of the mobile terminal 1 is off. The lock screen refers to a screen for accepting an unlocking operation. Once the mobile terminal 1 has been unlocked, a home screen including a plurality of operable menus is displayed.

The motion detecting section 14 detects a state of motion of the mobile terminal 1 in accordance with a signal received from the acceleration sensor 4 included in the mobile terminal 1. The motion detecting section 14 can be configured to detect rotational movement in accordance with a signal received from a gyroscopic sensor (not shown) included in the mobile terminal 1. The motion detecting section 14 also detects an attitude (incline) of the mobile terminal 1 by detecting, in accordance with a signal received from the acceleration sensor 4, a direction of gravity. The motion detecting section 14 supplies a detection result (the state of motion and the attitude) to the audio output control section 12.

The nearby object detecting section 15 detects a presence/absence of an object in proximity to (or in contact with) the screen of the mobile terminal 1, in accordance with a signal received from the proximity sensor 5 included in the mobile terminal 1. The nearby object detecting section 15 detects, for example, whether or not an object exists within a predetermined distance from the screen. The nearby object detecting section 15 supplies a detection result to the audio output control section 12. The proximity sensor 5 is provided, for example, in a vicinity of the screen of the mobile terminal 1, or in the screen of the mobile terminal 1. A touch panel configured to detect contact or a near-touch can serve as an alternative to the proximity sensor 5.

The position determining section 16 determines a position of the mobile terminal 1 in accordance with a signal received from the GPS sensor 6 included in the mobile terminal 1. The position determining section 16 can, for example, be configured to determine the position of the mobile terminal 1 (a range in which the mobile terminal 1 exists) in accordance with a signal received from a base station. The position determining section 16 supplies, to the audio output control section 12, information indicating the position of the mobile terminal 1. The GPS sensor 6 receives a signal from a GPS (global positioning system) satellite to determine the global position of the mobile terminal 1.

The light detecting section 17 detects brightness of an ambient environment in accordance with a signal received from the illuminance sensor 7 included in the mobile terminal 1. The light detecting section 17 supplies a detection result to the audio output control section 12. The illuminance sensor 7, which detects intensity of external light, is provided, for example, in the vicinity of the screen of the mobile terminal 1, or in the screen of the mobile terminal 1. The illuminance sensor 7 generates a signal which indicates the illuminance (or the intensity of external light).

(Timing of Audio Notification)

In order to avoid hindering user operation of the mobile terminal 1, Embodiment 1 employs an configuration in which audio is used to notify the user that the user-targeted information has been acquired. Furthermore, in order to avoid hindering user operation and use of the mobile terminal 1, this audio notification is carried out while the user is neither operating nor using the mobile terminal 1. Note, however, that in a case where the user is not near the mobile terminal 1, the user may not hear the audio notification. As such, the audio notification is preferably carried out immediately after the user finishes using the mobile terminal 1.

Figure 2:
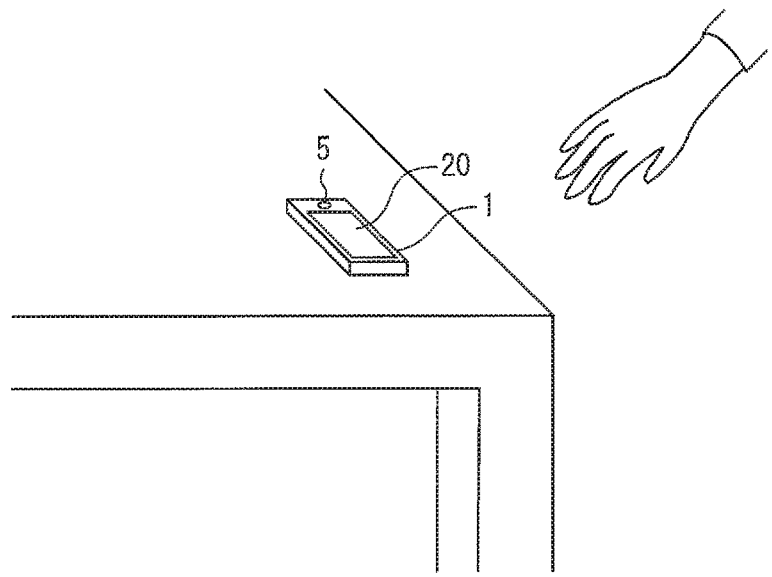
FIG. 2 is a perspective view illustrating the mobile terminal in a state of being placed on a flat surface of a desk.

FIG. 2 is a perspective view illustrating the mobile terminal 1 in a state of being placed on a flat surface of a desk. Once the user has finished using the mobile terminal 1, the user is likely to place the mobile terminal 1 on a flat surface, such as that of a desk, a table, or a shelf, as illustrated in FIG. 2. In doing so, the user will usually place the mobile terminal 1 so that the screen 20 (touch panel) faces upward. In Embodiment 1, the mobile terminal 1 (i) first detects such a state of the mobile terminal 1 after the user has finished use thereof and then (ii) carries out the audio notification that the user-targeted information has been acquired. The following will discuss in detail how the mobile terminal 1 processes the audio notification.

(Flow of Audio Notification Processing)

Figure 4:
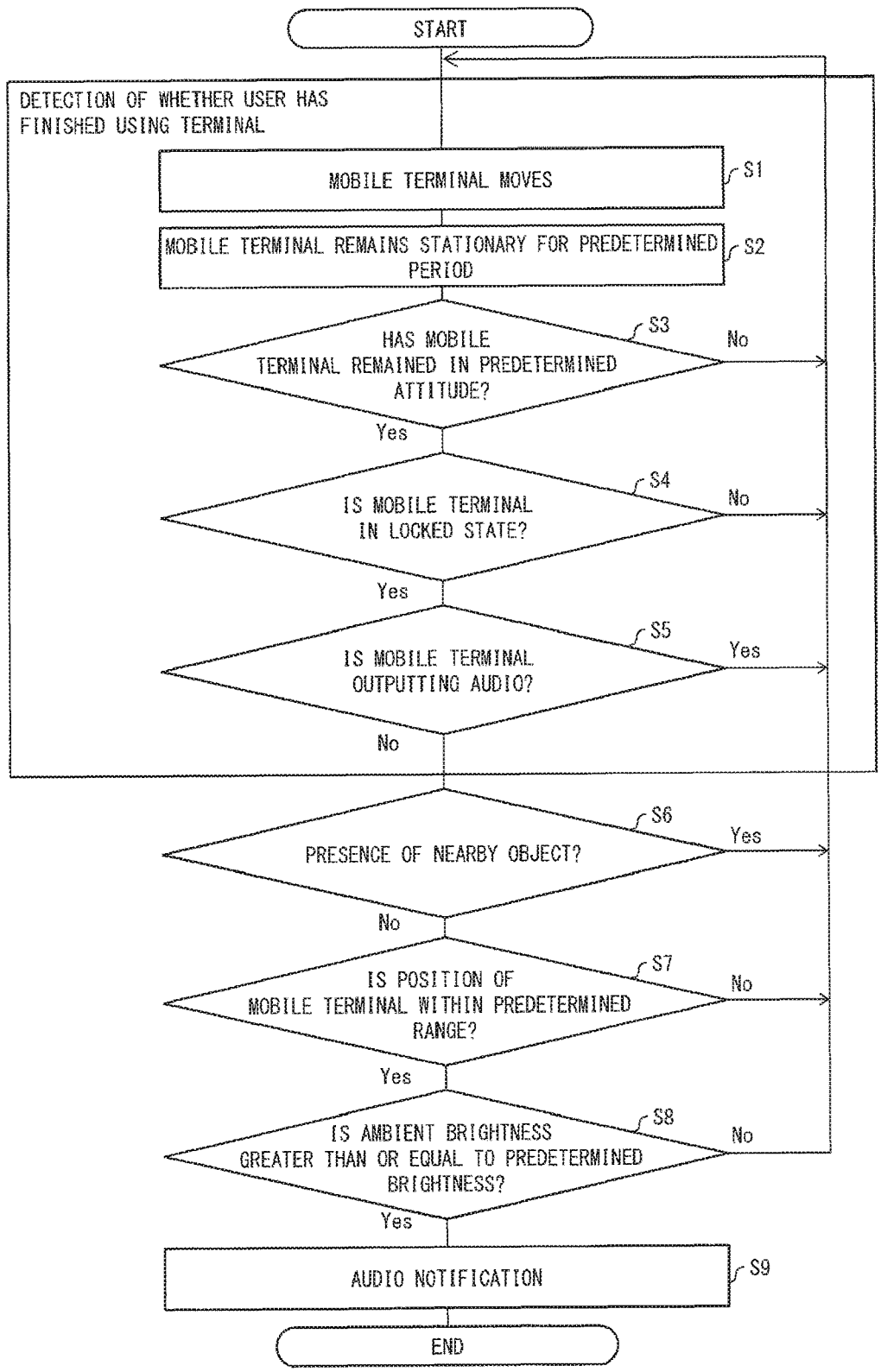
FIG. 4 is a diagram showing a flow of how the mobile terminal processes an audio notification.

FIG. 4 is a diagram showing a flow of how the mobile terminal 1 processes an audio notification. Processing starts once the mobile terminal 1 acquires the user-targeted information. The audio output control section 12 carries out the following various determinations in accordance with respective detection results received from the various sections. The audio output control section 12 first detects that the mobile terminal 1 has moved spatially (step S1). The processing does not proceed to the next step until the mobile terminal 1 moves.

Next, the audio output control section 12 detects that the mobile terminal 1 has remained stationary for a predetermined period (step S2) and, subsequently, determines whether or not the mobile terminal 1 has remained in a predetermined attitude for a predetermined period (step S3). The predetermined attitude can be, for example, a horizontal attitude. A horizontal attitude can refer to an attitude in which the screen 20 of the mobile terminal 1 is facing upwards (a direction opposite to the direction of gravity) and/or an attitude in which the screen 20 is facing downwards.

Note that (i) a predetermined period for determining that the mobile terminal 1 has remained stationary and (ii) a predetermined period for determining the attitude of the mobile terminal 1 can be of differing or identical length. For example, the audio output control section 12 can be configured to first detect that the mobile terminal 1 has remained stationary for a predetermined period (for example, 2 seconds), and then determine whether or not the mobile terminal 1 has remained in the predetermined attitude for a subsequent predetermined period (for example, 1 second).

The respective predetermined periods can be set to be greater than or equal to 1 second (for example, 5 seconds) or less than or equal to 1 second (for example, 0.2 seconds). Alternatively, the audio output control section 12 can be configured to determine whether or not the mobile terminal 1 has remained both stationary and in the predetermined attitude for a predetermined period (for example, 1 second).

Figure 3:
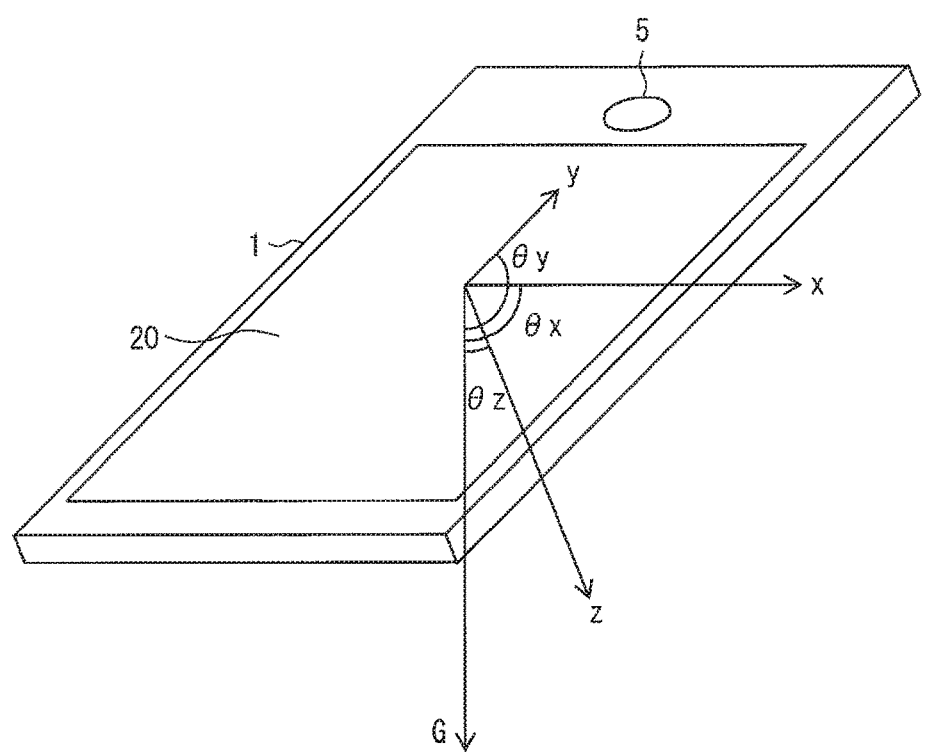
FIG. 3 is a diagram illustrating the mobile terminal in a state of being in a certain attitude.

FIG. 3 is a diagram illustrating the mobile terminal 1 in a state of being in a certain attitude. Here, an x-axis and a y-axis are defined as two axes in the plane of the screen 20, and a z-axis is defined as an axis which (i) is orthogonal to the screen 20 and (ii) extends in a direction which a back surface of the mobile terminal 1 faces. The attitude (incline) of the mobile terminal 1 can be expressed by angles $\theta x$, $\theta y$, and $\theta z$, which are angles formed by (i) a line representing the direction of gravity G and (ii) the x-axis, the y-axis, and the z-axis, respectively. For example, in a case where the mobile terminal 1 is completely horizontal, $\theta z=0°$ (that is, the z-axis coincides with the direction of gravity G). In such a case, $\theta x=90°$, and $\theta y=90°$. Note, however, that the audio output control section 12 can be configured to determine that the mobile terminal 1 is in the predetermined attitude in a case where the attitude of the mobile terminal 1 is within a certain range. For example, the audio output control section 12 can be configured to determine that the attitude of the mobile terminal 1 is substantially horizontal (or that the screen is facing upward) in a case where $\theta z \leq 15°$, and preferably in a case where $\theta z \leq 5°$. The audio output control section 12 can have a configuration in which an individual threshold value is set for each of $\theta x$ and $\theta y$, each threshold value being for determining the attitude of the mobile terminal 1. The audio output control section 12 can be configured to determine an attitude in which the screen 20 faces downward (for example, $165° \leq \theta z \leq 180°$) as being a horizontal attitude. The audio output control section 12 can also be configured such that in a case where $\theta x$, $\theta y$, and $\theta z$ are each within a range corresponding to a state in which the mobile terminal 1 has been placed in a compatible cradle, the audio output control section 12 determines that the mobile terminal 1 is in the predetermined attitude (an attitude corresponding to a state of being in the cradle). The predetermined attitude is an attitude which the mobile terminal 1 is in after the user has finished using the mobile terminal 1.

In a case where the mobile terminal 1 has not remained in the predetermined attitude for the predetermined period ("No" in step S3), processing returns to step S1, and the audio output control section 12 waits until the mobile terminal 1 is moved again. It can be presumed that, for example, while the mobile terminal 1 is being moved or while the mobile terminal 1 is in an inclined attitude, the user is using or carrying the mobile terminal 1. Furthermore, in a case where the user finishes using the mobile terminal 1 and places the mobile terminal 1 on, for example, a table, the user will normally place the mobile terminal 1 so that the screen faces upward.

In a case where the mobile terminal 1 has remained in the predetermined attitude for the predetermined period ("Yes" in step S3), the audio output control section 12 determines whether or not the mobile terminal 1 is in a locked state (step S4).

In a case where the mobile terminal 1 is not in a locked state ("No" in step S4), the processing returns to step S1, and the audio output control section 12 waits until the mobile terminal 1 is moved again. In a case where the mobile terminal 1 is not in a locked state, the user may be continuing use of the mobile terminal 1.

In a case where the mobile terminal 1 is in a locked state ("Yes" in step S4), the audio output control section 12 determines whether or not the audio output section 3 is outputting other audio (step S5). "Outputting other audio" refers to audio output, such as music playback or a voice call, other than the audio notification that the user-targeted information has been acquired.

In a case where the audio output section 3 is outputting other audio ("Yes" in step S5), the processing returns to step S1, and the audio output control section 12 waits until the mobile terminal 1 is moved again. In a case where the audio output section is outputting other audio, the user may be using the mobile terminal 1.

In a case where the audio output section 3 is not outputting other audio ("No" in step S5), the audio output control section 12 determines whether or not there is an object in proximity to (or in contact with) the screen 20 (step S6).

In a case where there is object in proximity to (or in contact with) the screen 20 ("Yes" in step S6), the processing returns to step S1, and the audio output control section 12 waits until the mobile terminal 1 is moved again. In a case where there is an object in proximity to the screen 20, it can be presumed that the mobile terminal 1 is in a pocket in the user's clothes, or in a bag. In such a case, the user may not notice the audio notification even if it were carried out.

In a case where there is no object in proximity to (or in contact with) the screen 20 ("No" in step S6), the audio output control section 12 determines whether or not the position of the mobile terminal 1 is within a predetermined range (step S7). The predetermined range can be, for example, a range including the user's home. The user can arbitrarily set the predetermined range in advance.

In a case where the position of the mobile terminal 1 is not within the predetermined ranged ("No" in step S7), the processing returns to step S1, and the audio output control section 12 waits until the mobile terminal 1 is moved again. In a case where, for example, the position of the mobile terminal 1 is not within a range including the user's home, it follows that the user and the mobile terminal 1 are outside of the user's home. In such a case, since there may be many people around the user, it is preferable not to carry out the audio notification.

In a case where the position of the mobile terminal 1 is within the predetermined range ("Yes" in step S7), the audio output control section 12 determines whether or not brightness in an area surrounding the mobile terminal 1 is greater than or equal to a predetermined brightness (step S8).

In a case where the brightness in the area surrounding the mobile terminal 1 is less than the predetermined brightness ("No" in step S8), the processing returns to step S1, and the audio output control section 12 waits until the mobile terminal 1 is moved again. In a case where the area surrounding the mobile terminal 1 is dark, for example, it may be the user's bedtime. In such a case, the mobile terminal 1 skips carrying out the audio notification in order to avoid interfering with the user's sleep.

In a case where the brightness in the area surrounding the mobile terminal 1 is greater than or equal to the predetermined brightness ("Yes" in step S8), the audio output control section 12 controls the audio output section 3 so that the audio output section 3 outputs the audio notification that the user-targeted information has been acquired (step S9). Upon execution of this step, the processing of the audio notification ends. In this case, the notification conditions include (i) a state where the mobile terminal 1 has moved, (ii) a state where the mobile terminal 1 subsequently remains stationary for the predetermined period, (iii) a state where the mobile terminal 1 has remained in the predetermined attitude, (iv) a state where the mobile terminal 1 is locked, (v) a state where the mobile terminal 1 is not outputting other audio, (vi), a state where there is no object in proximity to the screen, (vii) a state where the position of the mobile terminal 1 is within the predetermined range, and (viii) a state where the brightness in the area surrounding the mobile terminal 1 is greater than or equal to the predetermined brightness.

Note that the various determination steps described above can be carried out in any order. Note also that some of the determination steps (notification conditions) can be omitted. For example, the processing can be arranged such that steps S4 through S8 are omitted, and only steps S1 through S3 are used to determine that the user has finished using the mobile terminal 1. Examples of other possible arrangements include (i) processing in which only steps S7 and S8 are omitted and (ii) processing in which only steps S1, S2, S3, and S5 are used to determine that the user has finished using the mobile terminal 1.

In a case where a mobile terminal that has been left on a table for a long period of time acquires user-targeted information and then carries out audio notification soon thereafter, the user may not be nearby and therefore may not notice the audio notification.

In Embodiment 1, it is after the mobile terminal 1 has moved (after the user operates the mobile terminal 1) that the mobile terminal 1 determines that the user has finished using the mobile terminal 1. As such, the mobile terminal 1 can carry out the audio notification immediately after the user finishes using the mobile terminal 1, while the user is still near the mobile terminal 1. Also, since the mobile terminal 1 can carry out the audio notification after being placed on any flat surface, the mobile terminal 1 allows for many opportunities for notifying the user that the user-targeted information has been acquired.

Furthermore, in Embodiment 1, the mobile terminal 1 determines that the user has finished use thereof by carrying out a plurality of determinations relating to the state of the mobile terminal 1. This enables the mobile terminal 1 to accurately determine whether or not the user has finished using the mobile terminal 1. This ultimately makes it possible to notify the user of acquired information at an appropriate time and avoid hindering user operation and use of the mobile terminal 1. Once having received a notification, the user can then operate the mobile terminal 1 to display the user-targeted information on the screen 20 or cause the mobile terminal 1 to read aloud the user-targeted information. By using audio to notify the user that the user-targeted information has been acquired, the mobile terminal 1 obviates the need for the user to actively check (by looking at the screen, for example) whether or not there is viewable user-targeted information.

Embodiment 2

The following description will discuss Embodiment 2 of the present invention. Note that, for convenience, members having functions identical to those of the respective members described in Embodiment 1 are given respective identical reference numerals, and a description of those members is omitted here. Functional blocks of a mobile terminal 1 in accordance with Embodiment 2 are identical to those illustrated in FIG. 1. In Embodiment 2, the mobile terminal 1 detects a state of free-fall before carrying out an audio notification to the user.

FIG. 5 is a diagram showing a flow of how the mobile terminal 1 in accordance Embodiment 2 processes the audio notification. Processing starts once the mobile terminal 1 acquires user-targeted information. An audio output control section 12 carries out the following various determinations in accordance with respective detection results received from the various sections. The audio output control section 12 first detects that the mobile terminal 1 has been in a state of free-fall for a predetermined period (step S11). While the mobile terminal 1 is in a state of free-fall, an acceleration sensor 4 provided in the mobile terminal 1 does not sense gravitational acceleration. The predetermined period can be set to be, for example, 0.5 seconds, but can also be set to be shorter or longer. For example, in a case where the mobile terminal 1 is dropped from a stationary state, the mobile terminal 1 will fall about 50 cm in 0.3 seconds. Note that even in a case where the mobile terminal 1 is tossed upwards, a state of free-fall (parabolic movement) begins from the instant the mobile terminal 1 is tossed. In such a case, however, the phone will drop a shorter distance in the same period of 0.3 seconds due to initial upward movement. In a case where, for example, the user tosses the mobile terminal 1 onto a bed or a sofa, the mobile terminal 1 will be in a state of free-fall for the predetermined period. The audio output control section 12 is configured to detect this.

After detecting that the mobile terminal 1 has been in a state of free-fall for the predetermined period, the audio output control section 12 detects whether or not the mobile terminal 1 is in a locked state (step S4). As in Embodiment 1, the audio output control section 12 subsequently determines whether or not an audio output section 3 is outputting other audio (step S5) and whether or not there is an object in proximity to a screen 20 (step S6).

In a case where the audio output section is outputting other audio, it can be determined that the user is still using the mobile terminal 1. In a case where there is an object in proximity to the screen 20, it can be presumed that the mobile terminal 1 was in a state of free-fall while in a pocket in the user's clothes or a bag. In such a case, the user may not notice the audio notification even if it were carried out.

In a case where the mobile terminal 1 (i) has been in a state of free-fall for the predetermined period, (ii) is in a locked state, (iii) is not outputting other audio, and (iv) is not proximal to another object, the audio output control section 12 controls the audio output section 3 so that the audio output section 3 outputs the audio notification that the user-targeted information has been acquired (step S9). Upon execution of this step, the processing of the audio notification ends.

In Embodiment 2 as well, steps S4, S5, and/or S6 can be omitted. Embodiment 2 can also be arranged to include step S7 and/or step S8 which are shown in FIG. 4. In Embodiment 2, the audio output control section 12 determines that the user has finished using the mobile terminal 1 once the mobile terminal 1 has been in a state of free-fall for the predetermined period, regardless of whether the mobile terminal 1 has (i) remained stationary for a predetermined period and (ii) remained in a predetermined attitude for a predetermined period. However, the mobile terminal 1 of Embodiment 2 can, of course, also be arranged such that the processing includes, after detection of a state of free-fall, (i) determining that the mobile terminal 1 has remained stationary (step S2) and/or (ii) determining that the mobile terminal 1 has remained in the predetermined attitude (step S3). With the configuration of Embodiment 2, the mobile terminal 1 can carry out the audio notification immediately after the user finishes using the mobile terminal 1, while the user is still near the mobile terminal 1. Note also that with the configuration of Embodiment 2, the mobile terminal 1 will carry out the audio notification even in a case where the user unintentionally drops the mobile terminal 1. Embodiment 2 can therefore be expected to bring about an effect of preventing the user from losing the mobile terminal 1.

[Variations]

Although the above descriptions discuss a case where the mobile terminal is a smartphone, the present invention is not limited to such and can also be applied to a mobile terminal such as a mobile phone other than a smartphone, a tablet device, a digital book reader, and a PDA (personal digital assistant).

A mobile terminal in accordance with an aspect of the present invention can be configured to carry out the processing of both Embodiment 1 and Embodiment 2. Such a mobile terminal would carry out the audio notification in both (i) the case of being placed on a table and (ii) the case being tossed on a bed.

[Software Implementation Example]

A control block of the control section 2 (particularly, the information acquiring section 10, the speech content deciding section 11, the audio output control section 12, the lock detecting section 13, the motion detecting section 14, the nearby object detecting section 15, the position determining section 16, and the light detecting section 17) can be realized by a logic circuit (hardware) provided in an integrated circuit (IC chip) or the like or can be alternatively realized by software as executed by a central processing unit (CPU).

In the latter case, the control section 2 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recapitulation]

A mobile terminal in accordance with Aspect 1 of the present invention includes: an information acquiring section (information acquiring section 10) configured to acquire information to be provided to a user; a motion detecting section (motion detecting section 14) configured to detect a state of motion of the mobile terminal; an attitude detecting section (motion detecting section 14) configured to detect an attitude of the mobile terminal; an audio output determining section (audio output control section 12) configured to determine whether or not the mobile terminal is outputting audio; and an audio output control section (audio output control section 12) configured to, in a case where notification conditions have been satisfied, notify the user, via audio, of the information having been acquired, the notification conditions including: a state where the mobile terminal has remained stationary for a predetermined period after undergoing spatial movement; a state where, after the spatial movement, the mobile terminal has remained in a predetermined attitude for a predetermined period; and a state where, after the spatial movement, the mobile terminal is not outputting audio other than audio for notification.

The above configuration makes it possible to, in a case where (i) the user has put down the mobile terminal and (ii) the mobile terminal is not outputting other audio such as music, notify a user, via audio, that information to be provided to the user has been acquired. This makes it possible to carry out audio notification after the user has finished using the mobile terminal. It is therefore possible to prevent a problem where a notification hinders user operation or use of the mobile terminal. This enhances usability of the mobile terminal.

In Aspect 2 of the present invention, the mobile terminal in accordance with Aspect 1 can be arranged so that the predetermined attitude is an attitude in which a screen of the mobile terminal is facing upward.

The above configuration makes it possible to prevent an audio notification from being carried out in a case where the mobile terminal is stationary while being in, for example, a pocket or a bag.

A mobile terminal in accordance with Aspect 3 of the present invention includes: an information acquiring section configured to acquire information to be provided to a user; a motion detecting section configured to detect a state of motion of the mobile terminal; an audio output determining section configured to determine whether or not the mobile terminal is outputting audio; and an audio output control section configured to, in a case where notification conditions have been satisfied, notify the user, via audio, of the information having been acquired, the notification conditions including: a state where the mobile terminal has been in a state of free-fall for a predetermined period; and a state where the mobile terminal is not outputting audio other than audio for notification.

The above configuration makes it possible to, in a case where (i) the user has tossed or dropped the mobile terminal and (ii) the mobile terminal is not outputting other audio such as music, notify the user, via audio, that information to be provided to the user has been acquired.

In Aspect 4 of the present invention, a mobile terminal in accordance with any one of Aspects 1 through 3 can be arranged so as to further include a lock detecting section (lock detecting section 13) configured to detect a locked state of the mobile terminal, the notification conditions further including the mobile terminal being in the locked state.

In a case where the mobile terminal is in a locked state, it can be considered that the user is not using any application.

In Aspect 5 of the present invention, the mobile terminal in accordance with Aspect 4 can be arranged such that the locked state is a state in which an unlocking operation is required for the user to operate the mobile terminal.

In Aspect 6 of the present invention, a mobile terminal in accordance with any one of Aspects 1 through 5 can be arranged so as to further include a nearby object detecting section configured to detect whether or not there is an object in proximity to a screen of the mobile terminal, the notification conditions further including a state where there is no object in proximity to the screen.

The above configuration makes it possible to prevent an audio notification from being carried out in a case where the mobile terminal is stationary while being in, for example, a pocket or a bag.

In Aspect 7 of the present invention, a mobile terminal in accordance with any one of Aspects 1 through 6 can be arranged so as to further include a position determining section configured to determine a position of the mobile terminal, the notification conditions further including a state where the position of the mobile terminal is within a preset range.

The above configuration makes it possible to carry out an audio notification only in a case where the mobile terminal is in a predetermined position, such as the user's home. This makes it possible to prevent the mobile terminal from carrying out an audio notification in a public area.

In Aspect 8 of the present invention, a mobile terminal in accordance with any one of Aspects 1 through 7 can be arranged as to further include a light detecting section configured to detect brightness in an area surrounding the mobile terminal, the notification conditions further including a state where the brightness in the area surrounding the mobile terminal is greater than or equal to a predetermined brightness.

The above configuration makes it possible to prevent the mobile device from carrying out an audio notification at, for example, the user's bedtime.

A method, in accordance with Aspect 9 of the present invention, for controlling a mobile terminal, includes the steps of: (a) acquiring information to be provided to a user; (b) detecting a state of motion of the mobile terminal; (c) detecting an attitude of the mobile terminal; (d) determining whether or not the mobile terminal is outputting audio; and (e) controlling audio output so that in a case where notification conditions have been satisfied, the mobile terminal notifies the user, via audio, of the information having been acquired, the notification conditions including: a state where the mobile terminal has remained stationary for a predetermined period after undergoing spatial movement; a state where, after the spatial movement, the mobile terminal has remained in a predetermined attitude for a predetermined period; and a state where, after the spatial movement, the mobile terminal is not outputting audio other than audio for notification.

A method, in accordance with Aspect 10 of the present invention, for controlling a mobile terminal, includes the steps of: (a) acquiring information to be provided to a user; (b) detecting a state of motion of the mobile terminal; (c) determining whether or not the mobile terminal is outputting audio; and (d) controlling audio output so that in a case where notification conditions have been satisfied, the mobile terminal notifies the user, via audio, of the information having been acquired, the notification conditions including: a state where the mobile terminal has been in a state of free-fall for a predetermined period; and a state where the mobile terminal is not outputting audio other than audio for notification.

The mobile terminal in accordance with the foregoing aspects of the present invention may be realized by a computer. In such a case, the present invention encompasses: a control program for the mobile terminal which program causes a computer to operate as each section of the mobile terminal so that the mobile terminal can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

An embodiment of the present invention can be applied to a mobile terminal which provides information to a user.

REFERENCE SIGNS LIST

1 Mobile terminal
2 Control section
3 Audio output section
4 Acceleration sensor (motion detecting section, attitude detecting section)
5 Proximity sensor (nearby object detecting section)
6 GPS sensor (position determining section)
7 Illuminance sensor (light detecting section)
10 Information acquiring section
11 Speech content deciding section
12 Audio output control section (audio output control section, audio output determining section)
13 Lock detecting section
14 Motion detecting section (motion detecting section, attitude detecting section)
15 Nearby object detecting section
16 Position determining section
17 Light detecting section
20 Screen

The invention claimed is:

1. A mobile terminal comprising:
   circuitry; and
   memory associated with the circuitry; wherein
   the circuitry acquires information to be provided to a user;
   the circuitry detects a state of motion of the mobile terminal;
   the circuitry detects an attitude of the mobile terminal;
   the circuitry determines whether or not the mobile terminal is outputting audio; and
   the circuitry notifies the user, via audio, of the information having been acquired in a case where notification conditions have been satisfied,
   the notification conditions including:
   a state where the mobile terminal has remained stationary for a predetermined period after undergoing spatial movement;
   a state where, after the spatial movement, the mobile terminal has remained in a predetermined attitude for a predetermined period; and
   a state where, after the spatial movement, the mobile terminal is not outputting audio other than audio for notification.

2. The mobile terminal as set forth in claim 1, wherein the predetermined attitude is an attitude in which a screen of the mobile terminal is facing upward.

3. A mobile terminal as set forth in claim 1, wherein
   the circuitry detects a locked state of the mobile terminal, and
   the notification conditions further include the mobile terminal being in the locked state.

4. The mobile terminal as set forth in claim 3, wherein the locked state is a state in which an unlocking operation is required for the user to operate the mobile terminal.

5. A mobile terminal as set forth in claim 1, wherein
   the circuitry detects whether or not there is an object in proximity to a screen of the mobile terminal, and
   the notification conditions further include a state where there is no object in proximity to the screen.

6. A mobile terminal as set forth in claim 1, wherein
   the circuitry determines a position of the mobile terminal, and
   the notification conditions further including a state where the position of the mobile terminal is within a preset range.

7. A mobile terminal as set forth in claim 1, wherein
   the circuitry detects brightness in an area surrounding the mobile terminal, and
   the notification conditions further include a state where the brightness in the area surrounding the mobile terminal is greater than or equal to a predetermined brightness.

8. A method for controlling a mobile terminal, the method comprising the steps of:
   (a) acquiring information to be provided to a user;
   (b) detecting a state of motion of the mobile terminal;
   (c) detecting an attitude of the mobile terminal;
   (d) determining whether or not the mobile terminal is outputting audio; and
   (e) controlling audio output so that in a case where notification conditions have been satisfied, the mobile terminal notifies the user, via audio, of the information having been acquired,
   the notification conditions including:
   a state where the mobile terminal has remained stationary for a predetermined period after undergoing spatial movement;
   a state where, after the spatial movement, the mobile terminal has remained in a predetermined attitude for a predetermined period; and
   a state where, after the spatial movement, the mobile terminal is not outputting audio other than audio for notification.

9. The mobile terminal as set forth in claim 1, wherein:
   in a case where the notification conditions are not satisfied, the circuitry suspends notifying the user that the information has been acquired, until the notification conditions are satisfied.

10. The mobile terminal as set forth in claim 1, wherein:
    the circuitry notifies the user, via audio, that the information has been acquired, when the notification conditions are satisfied.

11. The mobile terminal as set forth in claim 1, wherein:
    the information is not urgent information but has been acquired from a server external to the mobile terminal.

12. The mobile terminal as set forth in claim 1, wherein:
    the information is news, event information, movie information, or information related to an anniversary, each of which has been acquired from a server external to the mobile terminal.

13. The method as set forth in claim 8, wherein:
    in a case where the notification conditions are not satisfied, the mobile terminal suspends, in the step (e), notifying the user that the information has been acquired, until the notification conditions are satisfied.

14. The method as set forth in claim 8, wherein:
    in the step (e), the mobile terminal notifies the user, via audio, that the information has been acquired, when the notification conditions are satisfied.

15. The method as set forth in claim 8, wherein:
    the information is not urgent information but has been acquired from a server external to the mobile terminal.

16. The method as set forth in claim 8, wherein:
the information is news, event information, movie information, or information related to an anniversary, each of which has been acquired from a server external to the mobile terminal.

\* \* \* \* \*